United States Patent
Rele et al.

(10) Patent No.: US 11,029,964 B1
(45) Date of Patent: Jun. 8, 2021

(54) BOOTING A SYSTEM-ON-CHIP

(71) Applicant: Xilinx, Inc., San Jose, CA (US)

(72) Inventors: Siddharth Rele, Navi Mumbai (IN); Shreegopal S. Agrawal, Hyderabad (IN); Kaustuv Manji, Hyderabad (IN); Aditya Chaubal, Fremont, CA (US)

(73) Assignee: XLNX, INC., San Jose, CA (US)

( * ) Notice: Subject to any disclaimer, the term of this patent is extended or adjusted under 35 U.S.C. 154(b) by 309 days.

(21) Appl. No.: 16/282,216

(22) Filed: Feb. 21, 2019

(51) Int. Cl.
 *G06F 9/4401* (2018.01)
 *G06F 21/30* (2013.01)
 *G06F 15/78* (2006.01)

(52) U.S. Cl.
 CPC ........ *G06F 9/4401* (2013.01); *G06F 15/7825* (2013.01); *G06F 21/30* (2013.01)

(58) Field of Classification Search
 CPC ..... G06F 9/4401; G06F 15/7825; G06F 21/30
 See application file for complete search history.

(56) References Cited

U.S. PATENT DOCUMENTS

| | | | |
|---|---|---|---|
| 6,941,538 B2 * | 9/2005 | Hwang | G06F 30/30 716/102 |
| 8,863,072 B1 * | 10/2014 | Jahnke | G06F 30/34 716/138 |
| 2008/0270778 A1 * | 10/2008 | Murray | G06F 8/60 713/1 |
| 2009/0172379 A1 * | 7/2009 | Rothman | G06F 9/4401 713/2 |
| 2015/0039876 A1 * | 2/2015 | Baratam | G06F 9/4401 713/2 |
| 2017/0123815 A1 * | 5/2017 | Sarmah | G06F 9/4408 |
| 2018/0330095 A1 * | 11/2018 | Packer Ali | G06F 21/44 |

* cited by examiner

*Primary Examiner* — Jaweed A Abbaszadeh
*Assistant Examiner* — Gayathri Sampath
(74) *Attorney, Agent, or Firm* — Crawford Maunu PLLC

(57) ABSTRACT

Approaches for configuring a system-on-chip (SOC) include generating component images for components of the SOC. A first component image is for a platform management controller, a second component image is for programmable logic, and a third component image is for a processor subsystem. The plurality of component images are assembled into a programmable device image, and the programmable device image is input to the platform management controller. The platform management controller is booted from the first component image, the programmable logic is configured with the second component image by the platform management controller in executing the first component image, and the processor subsystem is configured with the third component image by the platform management controller in executing the first component image.

20 Claims, 6 Drawing Sheets

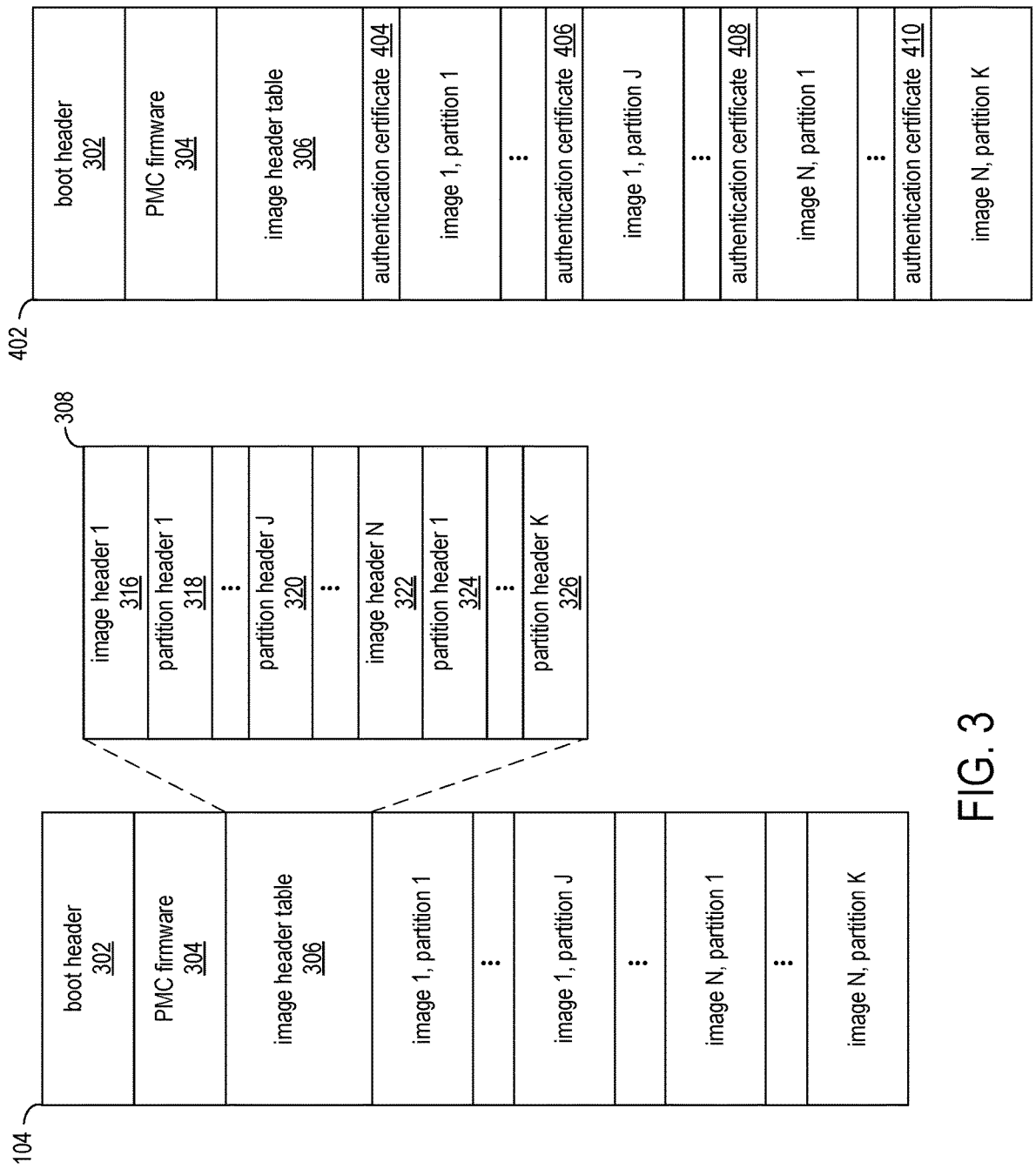

BOOTING A SYSTEM-ON-CHIP

TECHNICAL FIELD

The disclosure generally relates to booting a system-on-chip (SOC).

BACKGROUND

A system-on-chip (SOC) generally includes a number of different types of components integrated on a single semiconductor die or on several dice that are combined into an integrated circuit (IC) package. The components can include a processor(s) that executes program code, programmable logic and programmable interconnect that are configured to implement a desired application function, such as input/output interfaces or hardware-accelerated functions, dedicated digital signal processing (DSP) circuits that perform arithmetic functions, and configurable input/output physical channels.

The components of an SOC require different data to boot and perform runtime operations. The processor(s) can require multiple stage boot loaders and one or more application programs, the programmable logic requires a configuration bitstream that programs look-up tables and programmable interconnect, the DSP circuits can require configuration data to perform desired functions on desired data types, and the input/output channels require configuration data to correctly interface with external circuits.

SUMMARY

A disclosed method includes generating by a computer processor a plurality of component images for components of a system-on-chip (SOC). The plurality of component images includes a first component image for a platform management controller, a second component image for programmable logic, and a third component image for a processor subsystem. The method further includes assembling the plurality of component images into a programmable device image in a memory by the computer processor and inputting the programmable device image to the platform management controller. The method further includes booting platform management controller from the first component image, configuring the programmable logic with the second component image by the platform management controller in executing the first component image, and configuring the processor subsystem with the third component image by the platform management controller in executing the first component image.

A disclosed system includes a processor and a memory arrangement coupled to the processor. The memory arrangement is configured with instructions that when executed by the processor cause the processor to perform operations including generating a plurality of component images for components of a system-on-chip (SOC). The plurality of component images includes a first component image for a platform management controller, a second component image for programmable logic, and a third component image for a processor subsystem. The operations include assembling the plurality of component images into a first programmable device image, and inputting the first programmable device image to the platform management controller.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 3 shows an exemplary format of a programmable device image (PDI);

FIG. 4 shows an exemplary format of a PDI in which partitions of images have associated authentication certificates (ACs);

DETAILED DESCRIPTION

Figure 1:
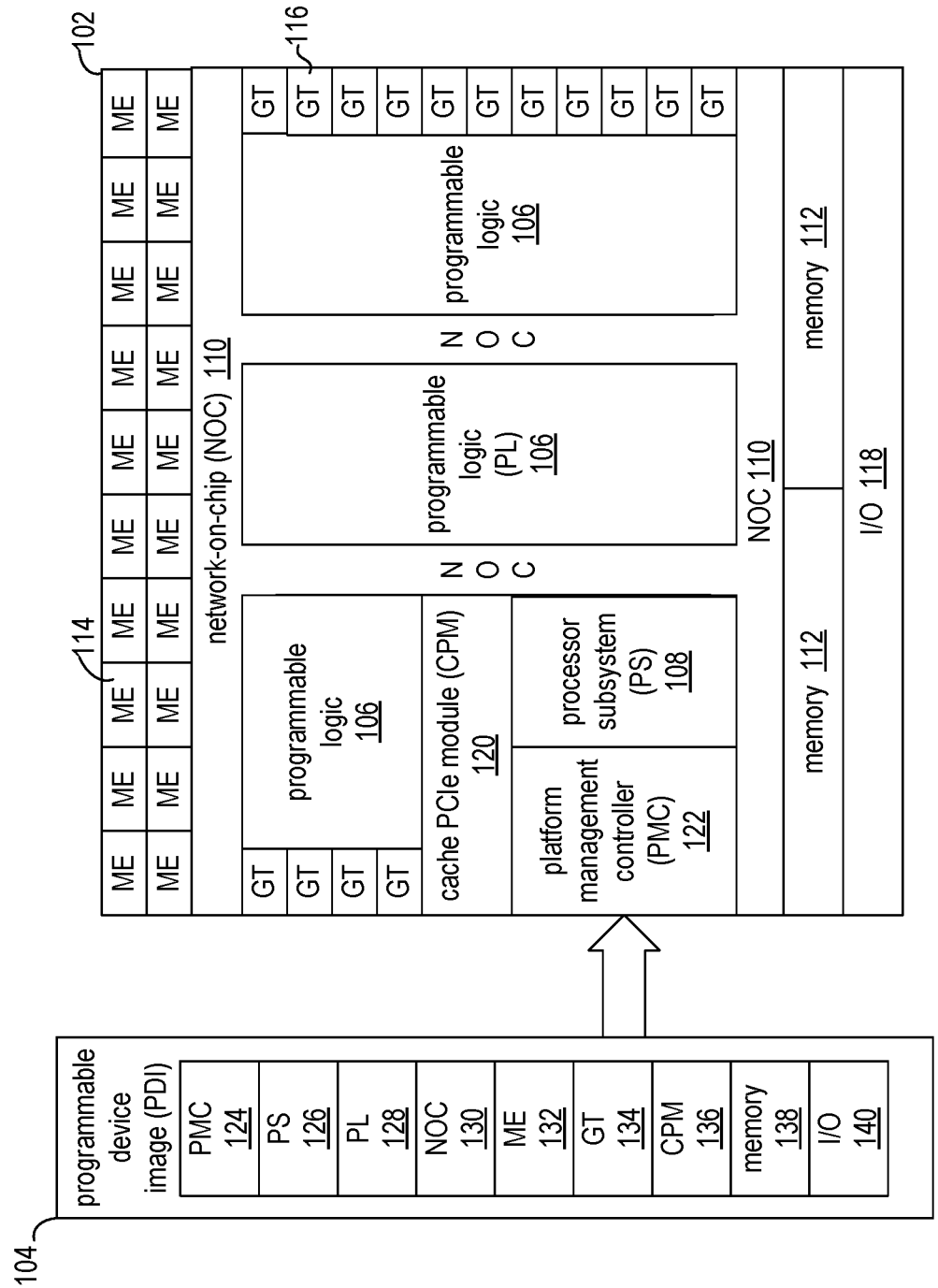
FIG. 1 shows an exemplary system on chip (SOC) and a programmable device image for configuring the SOC.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches support independent design flows for developing and testing hardware and software to be implemented on an SOC. When development and testing activities are complete, a single image, which includes component images for both hardware and processor components of the SOC, can be generated for configuring the SOC.

The disclosed approaches further support generating a single image by which an SOC can be configured. An SOC can include a platform management controller, a processor subsystem, programmable logic circuitry as well as other components. A design tool specifically programmed according to the disclosed methods can generate respective component images for the components of the SOC. The component images include a component image for the platform management controller, a component image for programmable logic circuitry, and a component image for a processor subsystem. Additional component images can be generated for other components of the SOC.

The design tool can assemble the component images into a programmable device image (PDI). The PDI can be a single, monolithic file. To configure the SOC, the PDI is input to the platform management controller, and the platform management controller boots from program code in the associated component image in the PDI. Once booted, the platform management controller executes further program code of the component image and configures the programmable logic of the SOC with the component image associated with the programmable logic in the PDI. The platform management controller also configures the processor subsystem with the associated component image in the PDI.

The disclosed processor-based initialization by way of the platform management controller allows control of the SOC as well as parallelism during the boot process. As an SOC can be a complex device having multiple hardware blocks requiring initialization, the blocks can be initialized in parallel and the initialization can be controlled by the platform management controller. Control of the boot processes by the platform management controller supports complex initializations instead of a complex finite state machine. For example, the platform management controller can control an initialization in which some hardware blocks need to be shut down and re-initialized at a later time. The platform management controller can continually monitor the state of the components of the SOC and as well as respond to any malicious attacks on the device.

FIG. 1 shows an exemplary system on chip (SOC) 102 and a programmable device image 104 for configuring the SOC. The SOC 102 includes various components that can be configured with component images in the programmable device image (PDI) 104. The SOC includes programmable logic (PL) circuitry 106, a processor subsystem (PS) 108, a network on chip (NOC) 110, on-chip memory modules 112, multiple math engine (ME) circuits 114, multiple gigabit transceiver (GT) circuits 116, an input/output (I/O) section 118, a cache PCIe module (CPM) 120, and a platform management controller (PMC) 122.

The PDI 104 can contain respective component images 122, 124, 126, 128, 130, 132, 134, 136, 138, and 140 for the components of the SOC. The platform management controller (PMC) 122 inputs the PDI and loads the input PMC image 124 that is included in the PDI, and boots from the image. Once booted, the PMC executes further code in the image, reads the other component images from the PDI, and configures the other components of the SOC with the respective images. The other components can be configured through the network-on-chip (NOC) 110.

The processor subsystem 108 may be programmed to implement a software portion of the user design, via execution of a user program. The processor subsystem may include, for example, one or more processor cores, floating point units (FPUs), an interrupt processing unit, etc.

The programmable logic circuitry 106 may be programmed to implement a hardware portion of a user design. For instance, the programmable logic circuitry may include a number of programmable resources, such as programmable interconnect circuits, programmable logic circuits, and configuration memory cells. The programmable logic can be configured by way of a configuration frame interface (not shown) that connects the PMC 122 to the configuration memory (not shown) of the programmable logic.

The processor subsystem 108 and the programmable logic circuitry 106 can read from or write to memory locations of on-chip memory module 112. The memory can include a memory controller (not shown) and one or more different types of memory circuits including, but not limited to: Double Data Rate (DDR) 2, DDR3, and DDR4 types of memory, whether 16-bit, 32-bit, 16-bit with ECC, etc. The list of different memory types is provided for purposes of illustration only and is not intended as a limitation or to be exhaustive.

The I/O section 118 of the SOC enables communication of data with circuits external to the SOC. The I/O section 118 can include various types of I/O devices or interfaces including, for example, flash memory type I/O devices, higher performance I/O devices, lower performance interfaces, debugging I/O devices, and/or RAM I/O devices.

The NOC 110 enables communication between the different components of the SOC 102. Through interconnected routing switches and directed by routing tables of the NOC, the programmable logic 106, math engines 114, processor subsystem 108, PMC 122, and CPM 120 can communicate.

The math engines (MEs) 114 are specialized circuits that are configurable to perform various arithmetic functions or combinations of arithmetic functions. For example, each ME can be configured to perform a multiply and accumulate function of selected inputs. The MEs 114 can offload selected arithmetic processing from the PS 108 as well as free resources of the PL 106 to perform other application functions.

The gigabit transceivers 116 support data transmission rates of multiple gigabit/sec and are configurable to support different modes of communication. For example, the GTs 116 can be configured for PCI Express, SFF-8431 (SFP+), 10GBASE-R/KR, Interlaken, 10 Gb attachment unit interface (XAUI), reduced pin extended attachment unit interface (RXAUI), 100 Gb attachment unit interface (CAUI), 40 Gb attachment unit interface (XLAUI), common packet radio interface (CPRI™) open base station architecture initiative (OBSAI), OC-48/192, optical channel transport unit (OTU): OTU-1, OTU-2, OTU-3, OTU-4, serial rapidIO (SRIO), serial advanced technology attachment (SATA), serial attached SCSI (SAS), and serial digital interface (SDI).

The CPM module 120 enforces cache coherent operations between processing elements implemented on the PS 108 and the PL 106.

Figure 2:
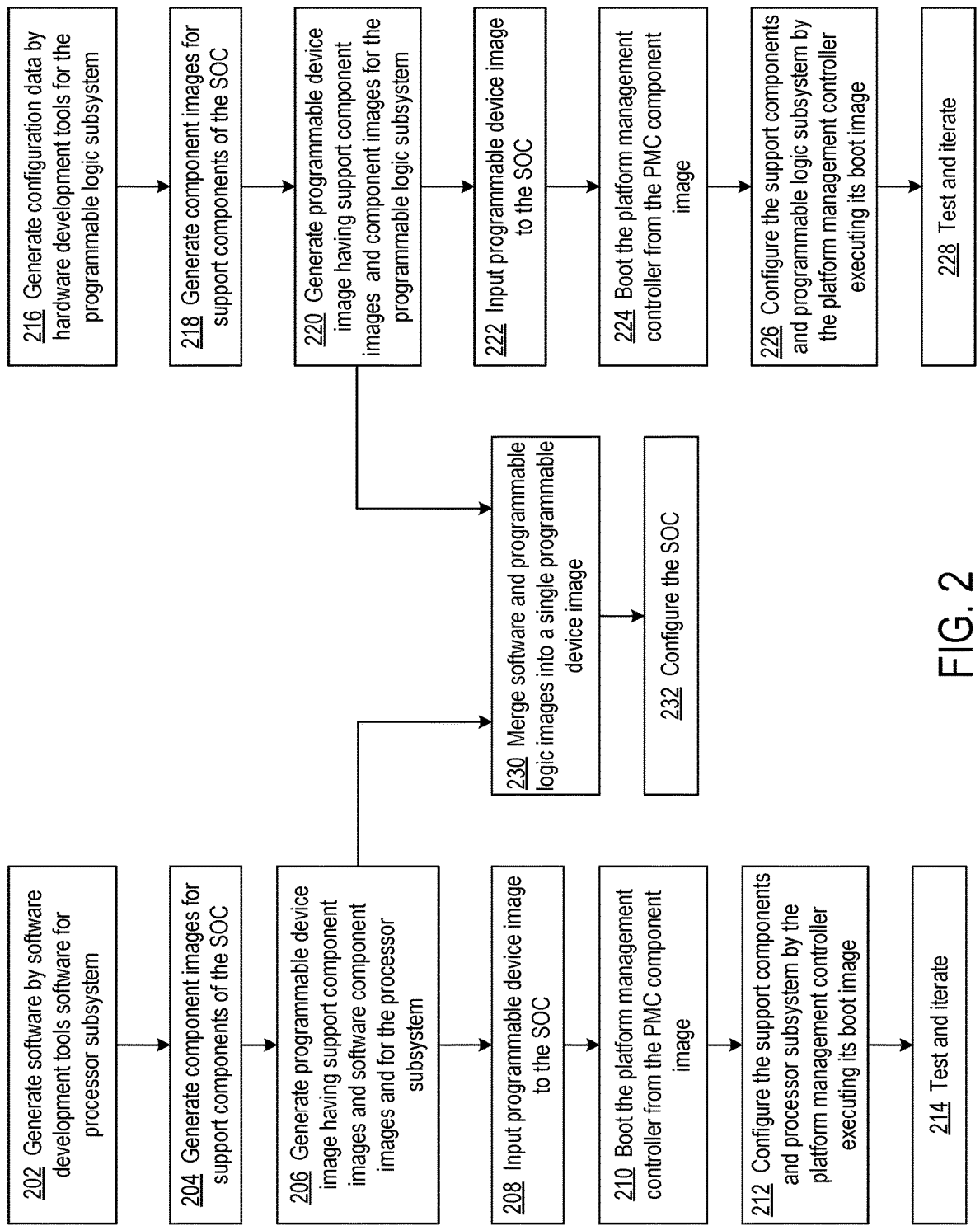
FIG. 2 is a flowchart illustrating processes for independent development of software and circuitry to be implemented on the processor and programmable logic resources of an SOC.

FIG. 2 is a flowchart illustrating processes for independent development of software and circuitry to be implemented on the processor and programmable logic resources of an SOC. After independently developing and testing the software and circuitry to be implemented on the SOC, the component images for the software and circuitry can be combined into a single programmable device image.

Blocks 202, 204, 206, 208, 210, 212, and 214 show a process for development of software for the SOC; blocks 216, 218, 220, 222, 224, 226, and 228 show a process for development of implementation data for circuitry of the SOC; and blocks 230, and 232 show the merging of the software and hardware portions of the design into a programmable device image.

During development of an application for an SOC, the software can be designed and tested on the SOC without running hardware implementation tools such as synthesis and place-and-route. At block 202, software can be specified and compiled using software development tools.

In order to boot the SOC 102 and execute software in the processor subsystem 108, a number of components may be needed to provide desired functionality. For example, the PMC 122 requires boot code to boot and additional program code to configure desired components of the SOC 102. Additionally, the NOC 110 may need to be configured to provide access to memory 112 and the I/O section 118, the CPM may need to be configured to enforce cache coherency, one or more MEs 114 may need to be configured to provide desired arithmetic functions, and one or more of the GTs 116 may need to be configured to support communications with the PS 108. At block 204, the design tool generates support component images that support booting the SOC and support software execution on the processor subsystem.

The design tool at block 206 generates a programmable device image having the support component images and one or more component images having software that is executable by the processor subsystem. The programmable device image is input to the PMC on the SOC at block 208.

At block 210, the PMC on the SOC boots from program code input as part of the programmable device image. Once booted and executing further program code from the programmable device image, the PMC at block 212 configures the support components from the support component images in the programmable device image and configures the processor subsystem with the associated component image. Configuring the processor subsystem can entail storing boot code, operating system code, and/or application programming code in memory 112 of the SOC.

At block 214, the software used to configure the processor subsystem of the SOC can be tested to determine if the software operates as expected. Based on the test results, the process of blocks 202, 204, 206, 208, 210, 212, and 214 can be repeated if needed to correct any deficiencies and thereafter retest.

In developing a circuit to be implemented on the programmable logic 106 of the SOC 102, the circuit can be designed and tested on the SOC without running software development tools and configuring the processor subsystem of the SOC to execute software. At block 216, configuration data targeted to the programmable logic can be generated by circuit development design tools. At block 218, the design tool generates the support component images as explained above.

The design tool at block 220 generates a programmable device image having the support component images and the component image for configuring the programmable logic of the SOC. The programmable device image is input to the PMC on the SOC at block 222.

At block 224, the PMC on the SOC boots from program code input as part of the programmable device image. Once booted and executing further program code from the programmable device image, the PMC at block 226 configures the support components from the support component images in the programmable device image and configures the programmable logic with the associated component image. Configuring the programmable logic can entail storing configuration data specified in the image in configuration memory that is coupled to logic and interconnect circuitry.

At block 228, the circuitry implemented in the programmable logic of the SOC can be tested to determine if the circuit operates as expected. Based on the test results, the process of blocks 216, 218, 220, 222, 224, 226, and 228 can be repeated if needed to correct any deficiencies and thereafter retest.

Once the designers are satisfied with the operation of both the software and circuit components of the SOC design, the component images for the processor subsystem and the programmable logic can be merged by the design tool into a single programmable device image as shown by block 230. At block 232, the SOC can be configured by inputting the programmable device image to the PMC as described above.

In another aspect, at blocks 206 and 220 the design tool can encrypt the component images and generate respective authentication codes from the component images. The authentication codes can be embedded in the programmable device image and verified by the PMC prior to configuring the SOC.

FIG. 3 shows an exemplary format of a programmable device image (PDI) 104. The PDI is a collection of different component images assembled into a file to form a single monolithic image. Each component image can be divided into multiple partitions. A partition is a contiguous address space within the PDI file and contains data for configuring the associated SOC component. Each image header includes data that identify the component to be configured, making the location within the PDI of a component image independent of the component to be configured.

The PDI includes a boot header 302, PMC firmware 304, an image header table 306, and multiple component images, each of which can be divided into multiple partitions. For example, the PDI has N images, identified as image 1, . . . , image N. Image 1 has J partitions identified as partition 1, . . . , partition J, and image N has K partitions identified as partition 1, . . . , partition K.

The PMC boots using information in the boot header 302 and executable program code in the firmware 304. The PMC executes further program code in the firmware in obtaining images from the PDI 104 and configuring components of the SOC.

The image header table 306, a more detailed depiction of which is shown as block 308, includes an image header for each of the component images in the PDI. In the example, the image header table 306 has image header 1, . . . , image header N (block 316 and block 322) associated with image 1, . . . , image N, respectively. Each image header can have multiple partition headers associated therewith. For example, image header 1 has associated partitions headers 1-J (blocks 318 and 320), and image header N has associated partition headers 1-K (blocks 324 and 326. The image header can identify the SOC component to be configured by the image, and each partition header can indicate an address of the associated partition in the PDI and an address of another partition of the component image.

FIG. 4 shows an exemplary format of a programmable device image 402 in which partitions of images have associated authentication certificates (ACs). Each partition can be encrypted and can have an associated AC. The ACs can be hash message authentication codes, for example. AC 404 covers image 1, partition 1, AC 406 covers image 1, partition J, . . . , AC 408 covers image N, partition 1, . . . , and AC 410 covers image N, partition K.

Figure 5:
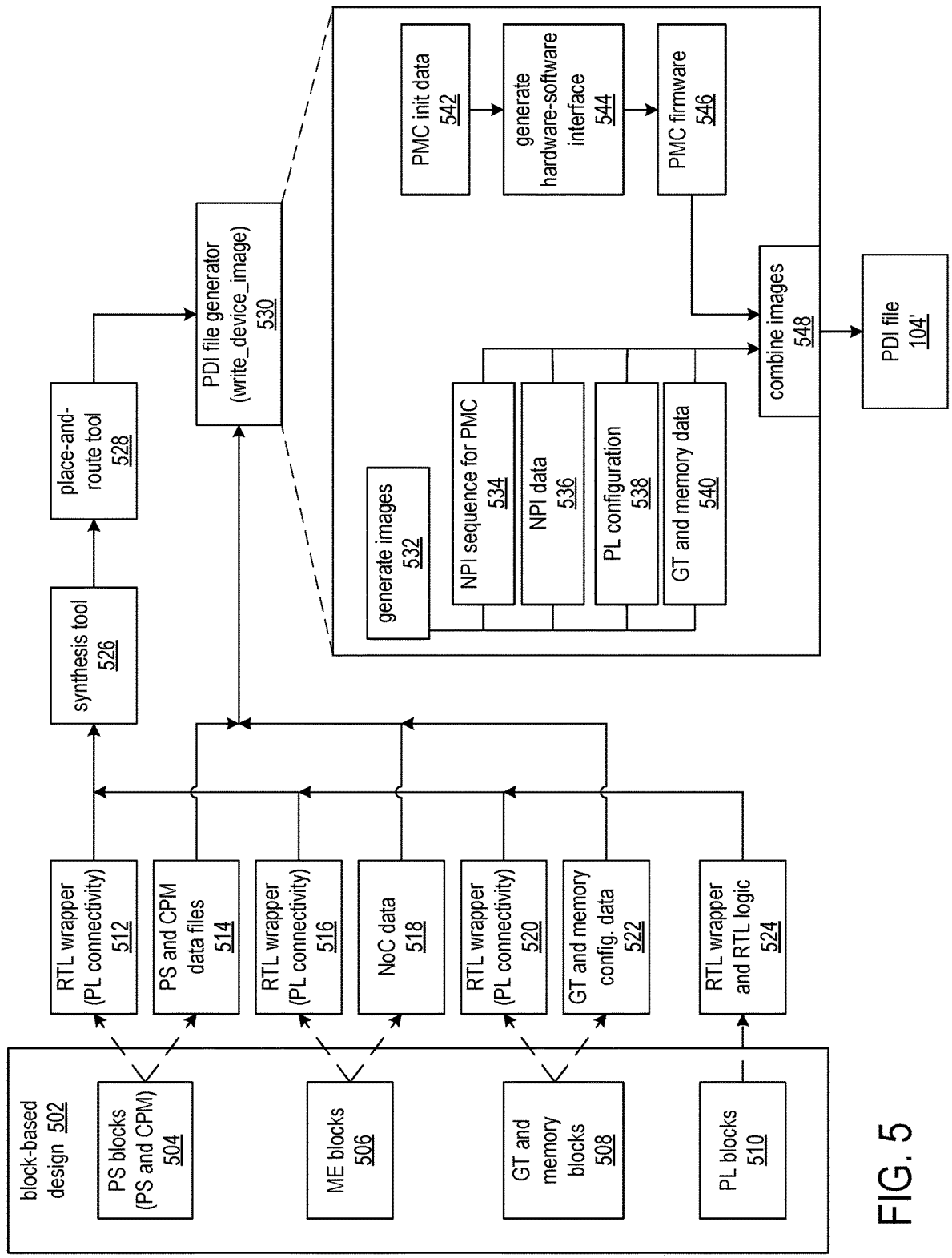
FIG. 5 shows an exemplary design flow in which a PDI for an SOC is generated to include configuration data for programmable logic of the SOC.

FIG. 5 shows an exemplary design flow in which a programmable device image (PDI) for an SOC is generated to include configuration data for programmable logic of the SOC. As FIG. 5 illustrates a "hardware-only" flow, the PDI does not include a component image including application software for the processor subsystem of the SOC. Note however, that the PDI can include a support component that allows the processor subsystem to boot and idle.

A block-based design 502 includes various functional blocks for implementing circuitry on an SOC. The block-based design can include PS blocks 504, ME block 506, GT and memory blocks 508, and PL blocks 510. The PS blocks are provided for connectivity to the processor subsystem and not intended to depict application software to be implemented on the processor subsystem. The PS blocks include a register transfer language (RTL) wrapper 512 and PS and CPM data files 514. The RTL wrapper specifies circuitry through which circuits implemented in the programmable logic circuitry can communicate with the processor subsystem. The PS and CPM data files specify configuration data that the PMC uses to configure the CPM and processor subsystem for PCIe communications.

The ME blocks 506 include an RTL wrapper 516 and NOC data 518. The RTL wrapper 516 specifies circuitry through which circuits implemented in the programmable logic circuitry can communicate with the ME circuits, and the NOC data specifies routing tables of the NOC to support communication between the ME circuits and the programmable logic.

The GT and memory blocks 508 include an RTL wrapper 520 and configuration data 522. The RTL wrapper 520 specifies circuitry through which circuits implemented in the programmable logic circuitry can communicate with the GTs and on-chip memory. The configuration data can include ELF files that are used during boot time for calibration of the memory controllers and GTs. Microblaze processors within the memory controllers and GTs execute the ELF files for calibration.

The PL blocks 510 include RTL logic that specifies a wrapper and logic that specifies application-specific functions to be implemented on the programmable logic circuitry of the SOC. The wrapper logic supports communication between the programmable logic of the SOC and other components over the NOC.

The RTL wrappers and logic are input to and processed by synthesis tool 526. The synthesized design is further processed by the place-and-route tool 528, and the placed and routed circuit design data is input to the PDI file generator 530.

The PDI file generator 530 generates a PDI file 104', and the generator can be part of an electronic design automation (EDA) tool that supports design entry, synthesis, place-and-route, etc. The generate images function 532 of the PDI file generator generates an NOC Peripheral Interconnect (NPI) sequence 534 for the PMC, NPI data 536, PL configuration 538, and GT and memory data 540.

The NPI sequence for PMC 534 includes information that describes the startup of hardware blocks ("NPI blocks") that provide the interface between components of the SOC, such as the memory controller of the memory 112 and GTs 116 (FIG. 1) and the NOC. The PMC executes certain commands in order to start up each of the NPI blocks. The NPI sequence for PMC 534 also gives the order in which the components are brought out of reset.

The NPI data 536 includes address and value pairs for programming registers used by the components to interface with the NOC 110. Each component has registers which need to be programmed to reflect the configuration of the component.

The PL configuration includes configuration data for the configuration memory cells that control the function implemented by the programmable logic of the SOC, and the GT and memory data contain the ELF data described above.

The generate hardware-software interface function 544 inputs PMC initialization data 542 and generates PMC firmware 546. The PMC init data 542 contains the initialization sequence for the PMC block itself. The PMC init data configures the boot device memory and sets up clocks and phase locked loops (PLL) for the PMC block. The PMC firmware 546 is firmware executed by the PMC for loading the PMC init data, and is not dependent on the design to be implemented on the SOC.

The combine images function 548 combines the component images generated by the generate images function 532 and generate hardware-software interface function 544 into PDI file 104'.

Figure 6:
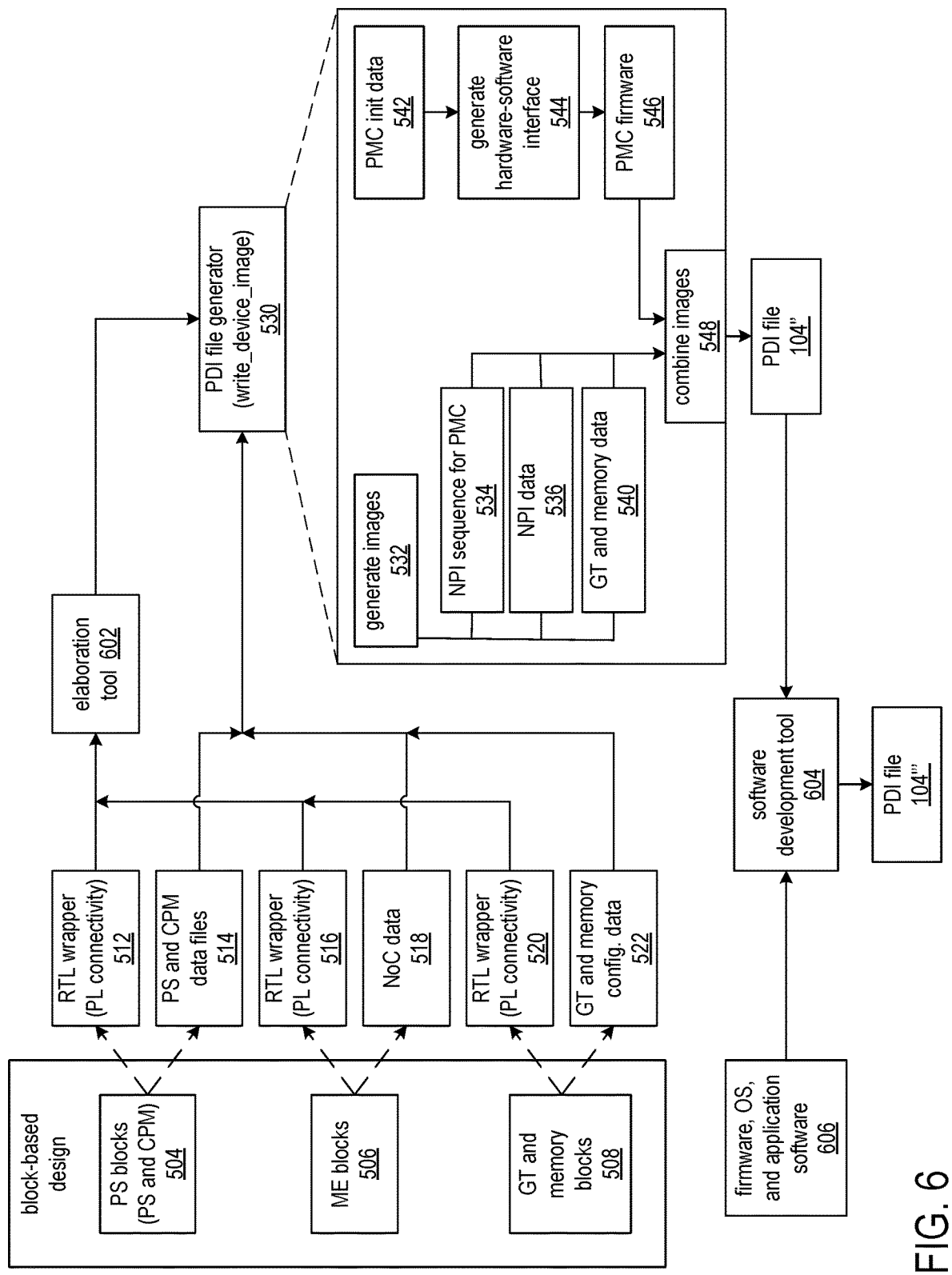
FIG. 6 shows an exemplary design flow in which a PDI for an SOC is generated to include software for a processor subsystem of the SOC.

FIG. 6 shows an exemplary design flow in which a programmable device image for an SOC is generated to include software for a processor subsystem of the SOC. The design flow of FIG. 6 differs from the design flow of FIG. 5 in that no PL application logic is processed into a component image in the PDI file 104" or 104"'.

The elaboration tool 602 compiles the RTL sources and creates a top-level design. The top-level design allows generation of the device image when only fixed-logic components are specified (no programmable logic). The elaboration tool produces programming data for various NPI blocks as well as placement information (routing is not needed). In a design flow involving logic for programmable logic 106 (which is not shown in FIG. 6), synthesis and place-and-route tools would generate the NPI data.

PDI file 104" includes component images that allow the SOC to be booted by the PMC and the processor subsystem to interface with on-chip memory and input-output circuitry. The PDI file 104" is input by the software development tool 604, which supports development of the firmware, operating system (OS), and application software 606. The software development tool 604 adds executable program code (firmware, OS, and application software) as component images to the PDI file 104", resulting in PDI file 104"'.

Figure 7:
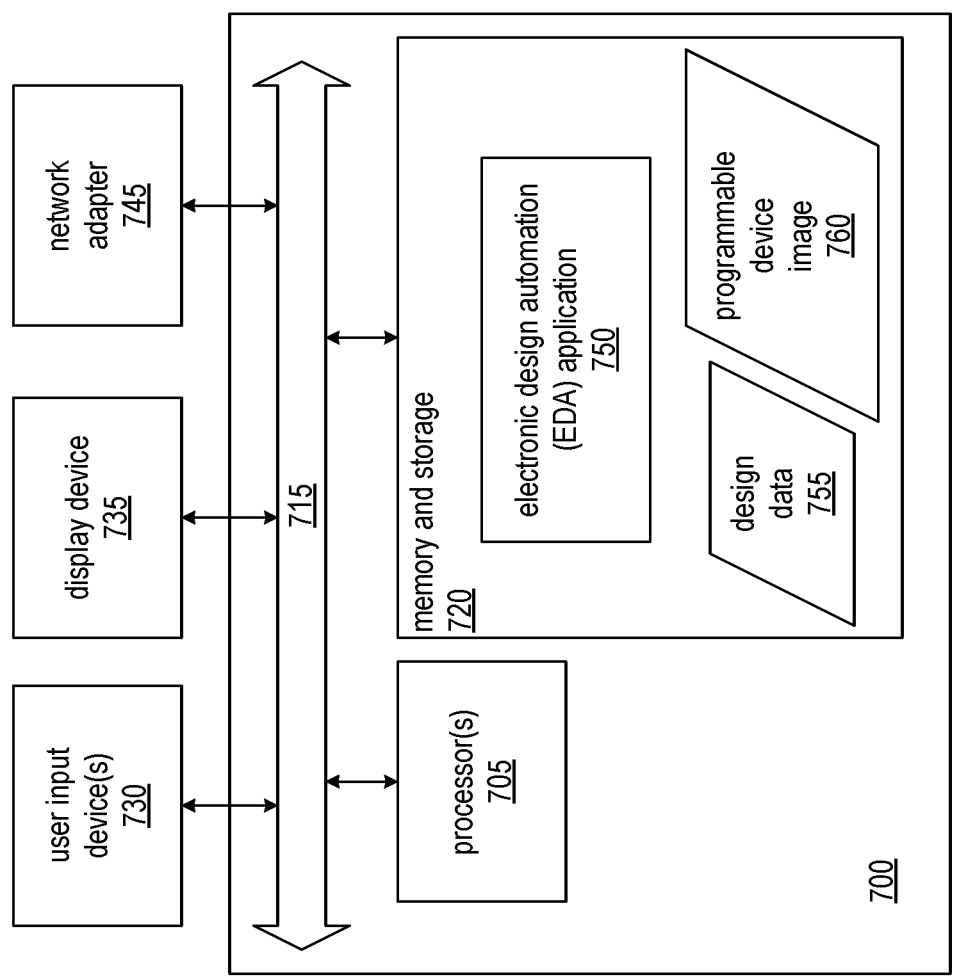
FIG. 7 is a block diagram illustrating an exemplary data processing system.

FIG. 7 is a block diagram illustrating an exemplary data processing system (system) 700. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 100 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on design data 755. In one aspect, system 700 performs a design flow on design data 755, and the design flow may include the processes shown and described above. System 700 generates programmable device image 760 based on the design data 755.

EDA application 750, design data 755, programmable device image 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Some implementations are directed to a computer program product (e.g., nonvolatile memory device), which includes a machine or computer-readable medium having stored thereon instructions which may be executed by a computer (or other electronic device) to perform these operations/activities Though aspects and features may in some cases be described in individual figures, it will be appreciated that features from one figure can be combined with features of another figure even though the combination is not explicitly shown or explicitly described as a combination.

The methods and system are thought to be applicable to a variety of systems for programming SOCs. Other aspects and features will be apparent to those skilled in the art from consideration of the specification. It is intended that the specification and drawings be considered as examples only, with a true scope of the invention being indicated by the following claims.

What is claimed is:

1. A method comprising:
    generating by a computer processor a plurality of component images for components of a system-on-chip (SOC), wherein the plurality of component images include a first component image for a platform management controller, a second component image for programmable logic, and a third component image for a processor subsystem;
    assembling the plurality of component images into a first programmable device image in a memory by the computer processor;
    inputting the first programmable device image to the platform management controller;
    booting the platform management controller from the first component image;
    configuring the programmable logic with the second component image by the platform management controller in executing the first component image; and
    configuring the processor subsystem with the third component image by the platform management controller in executing the first component image.

2. The method of claim 1, wherein assembling the plurality of component images into the first programmable device image includes:
    assembling a second programmable device image including only the first component image and the second component image;
    assembling a third programmable device image including only the first component image and the third component image; and
    merging the second programmable device image and the third programmable device image into the first programmable device image.

3. The method of claim 1, wherein the generating the plurality of component images includes generating a network-on-chip (NOC) component image.

4. The method of claim 1, wherein the generating the plurality of component images includes generating component images for input-output components of the SOC.

5. The method of claim 1, wherein the assembling the plurality of component images into the first programmable device image includes:
    dividing a component image of the plurality of component images into a plurality of partitions; and
    storing each partition in contiguous address space of the memory.

6. The method of claim 5, wherein the assembling the plurality of component images into the first programmable device image includes storing a plurality of image headers in the first programmable device image, each image header associated with one of the plurality of component images and including data that identifies one of the components of the SOC.

7. The method of claim 6, wherein the assembling the first programmable device image includes storing a plurality of partition headers in the programmable device image, wherein each partition header specifies a length of the partition header and an address of another partition of the plurality of partitions.

8. The method of claim 6, wherein the assembling the first programmable device image includes storing a plurality of authentication certificates in association with the plurality of partitions in the programmable device image.

9. The method of claim 6, wherein:
    the generating the plurality of component images includes encrypting the plurality of component images; and
    the assembling the plurality of component images into the first programmable device image includes storing encrypted versions of the plurality of component images in the memory.

10. The method of claim 6, wherein:
    the assembling the first programmable device image includes storing a plurality of authentication certificates in association with the plurality of partitions in the programmable device image;
    the generating the plurality of component images includes encrypting the plurality of component images; and
    the assembling the plurality of component images into the first programmable device image includes storing encrypted versions of the plurality of component images in the memory.

11. A system comprising:
    a system-on-chip (SOC);
    a processor coupled to the SOC;
    a memory arrangement coupled to the processor and configured with instructions that when executed by the processor cause the processor to perform operations including:
        generating a plurality of component images for components of the SOC, wherein the plurality of component images include a first component image for a platform management controller, a second component image for programmable logic, and a third component image for a processor subsystem;
        assembling the plurality of component images into a first programmable device image;
        inputting the first programmable device image to the platform management controller;
        booting the platform management controller from the first component image;
        configuring the programmable logic with the second component image by the platform management controller in executing the first component image; and
        configuring the processor subsystem with the third component image by the platform management controller in executing the first component image.

12. The system of claim 11, wherein the instructions for assembling the plurality of component images into the first programmable device image include instructions that when executed by the processor cause the processor to perform operations including:

assembling a second programmable device image including only the first component image and the second component image;

assembling a third programmable device image including only the first component image and the third component image; and merging the second programmable device image and the third programmable device image into the first programmable device image.

13. The system of claim 11, wherein the instructions for generating the plurality of component images include instructions that when executed by the processor cause the processor to generate a network-on-chip (NOC) component image.

14. The system of claim 11, wherein the instructions for generating the plurality of component images include instructions that when executed by the processor cause the processor to generate component images for input-output components of the SOC.

15. The system of claim 11, wherein the instructions for assembling the plurality of component images into the first programmable device image include instructions that when executed by the processor cause the processor to perform operations including:

dividing a component image of the plurality of component images into a plurality of partitions; and storing each partition in contiguous address space of the memory.

16. The system of claim 15, wherein the instructions for assembling the plurality of component images into the first programmable device image include instructions that when executed by the processor cause the processor to store a plurality of image headers in the first programmable device image, each image header associated with one of the plurality of component images and including data that identifies one of the components of the SOC.

17. The system of claim 16, wherein the instructions for assembling the first programmable device image include instructions that when executed by the processor cause the processor to store a plurality of partition headers in the programmable device image, wherein each partition header specifies a length of the partition header and an address of another partition of the plurality of partitions.

18. The system of claim 16, wherein the instructions for assembling the first programmable device image include instructions that when executed by the processor cause the processor to store a plurality of authentication certificates in association with the plurality of partitions in the programmable device image.

19. The system of claim 16, wherein:

the instructions for generating the plurality of component images include instructions that when executed by the processor cause the processor to encrypt the plurality of component images; and the instructions for assembling the plurality of component images into the first programmable device image include instructions that when executed by the processor cause the processor to store encrypted versions of the plurality of component images in the memory.

20. The system of claim 16, wherein:

the instructions for assembling the first programmable device image include instructions that when executed by the processor cause the processor to store a plurality of authentication certificates in association with the plurality of partitions in the programmable device image;

the instructions for generating the plurality of component images include instructions that when executed by the processor cause the processor to encrypt the plurality of component images; and the instructions for assembling the plurality of component images into the first programmable device image include instructions that when executed by the processor cause the processor to store encrypted versions of the plurality of component images in the memory.

\* \* \* \* \*